(12) United States Patent
Saltsidis (10) Patent No.: US 8,310,941 B2
(45) Date of Patent: Nov. 13, 2012

(54) DATA DRIVEN CONNECTION FAULT MANAGEMENT (DDCFM) IN CFM MAINTENANCE POINTS

(75) Inventor: Panagiotis Saltsidis, Stockholm (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 848 days.

(21) Appl. No.: 12/105,610

(22) Filed: Apr. 18, 2008

(65) Prior Publication Data

US 2008/0291823 A1 Nov. 27, 2008

Related U.S. Application Data

(60) Provisional application No. 60/939,245, filed on May 21, 2007.

(51) Int. Cl.
*G01R 31/08* (2006.01)
(52) U.S. Cl. .......................................... 370/242
(58) Field of Classification Search .................. 370/241, 370/236, 240
See application file for complete search history.

(56) References Cited

U.S. PATENT DOCUMENTS

| | | | | |
|---|---|---|---|---|
| 5,734,699 | A * | 3/1998 | Lu et al. .................. | 455/422.1 |
| 5,901,352 | A * | 5/1999 | St-Pierre et al. ........ | 455/426.1 |
| 2007/0140126 | A1 * | 6/2007 | Osswald et al. ........ | 370/236.2 |
| 2007/0217438 | A1 * | 9/2007 | Kondo et al. ............ | 370/404 |
| 2008/0016402 | A1 * | 1/2008 | Harel et al. ............. | 714/43 |
| 2008/0112333 | A1 * | 5/2008 | Busch et al. ............ | 370/252 |

OTHER PUBLICATIONS

IEEE P802.1Qaw/D0.2 Virtual Bridged Local Area Netwrks-Amendment 10: Data Driven and Data Dependent CFM Apr. 27, 2007 (NPL is provided by the applicant in the file wrapper).*

DDCFM contribution. Draft Amendment to IEEE Std 802.1Q, Sep. 15, 2006, retrieved from http://www.ieee802.org/1/pages/802.1aw.html, p. 11, p. 30, figures 19-3; 40-1; 40-5.

IEEE 802.1Qaw, Draft Standard for Local and Metropolitan Area Networks—Virtual Bridged Local Bridged LAN—Amendment 10: Virtual Bridged LAN, Management of Data Driven and Data Dependent Connectivity Fault Management, Apr. 2007: retrieved http://ieeexplore.ieee.org/xpls/abs_all.jsp?arnumber=4432382, sections 19 and 40.

"IEEE Standard for Local and Metropolitan Area Networks—Virtual Bridged LANs—Amendment 5: Connectivity Fault Management", Feb. 2007.

"IEEE P802.1ag/D8 Draft Standard for Local and Metropolitan Area Networks—Amendment 5: Connectivity Fault Mgmt." Feb. 8, 2007.

Seaman: "Diagnosing Data Dependent and Data Driven Connectivity Faults", Mar. 15, 2006.

Dunbar: "P802.1aw (DDCFM) Managed Objects Definition and Operations" Mar. 8, 2007.

Seaman: "DDCFM—Data Dependent and Data Driven Connectivity Fault Management" Mar. 12, 2006.

* cited by examiner

*Primary Examiner* — Anh-Vu Ly
*Assistant Examiner* — Mohammad Anwar (57) ABSTRACT

A Connection Fault Management (CFM) maintenance point and method for providing Data Driven Connection Fault Management (DDCFM) in CFM maintenance points in a communication network. A Reflection Responder, an RFM Receiver, and a Decapsulator Responder are implemented in existing CFM maintenance points. The Reflection Responder selects frames to be reflected, mirrors the selected frames if a Continuation option is set, and encapsulates the selected frames with Return Frame Message (RFM) OpCode. The RFM Receiver sends received RFM frames to an analyzer if addressed to the maintenance point and otherwise to a passive multiplexer. The Decapsulator Responder decapsulates Send Frame Message (SFM) frames and sends decapsulated frames toward the destination specified in each frame.

3 Claims, 9 Drawing Sheets

DATA DRIVEN CONNECTION FAULT MANAGEMENT (DDCFM) IN CFM MAINTENANCE POINTS

RELATED APPLICATIONS

This application claims the benefit of U.S. Provisional Application No. 60/939,245 filed May 21, 2007.

CROSS-REFERENCE TO RELATED APPLICATIONS

NOT APPLICABLE

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND

This invention relates to fault detection and isolation systems in communication networks. More particularly, and not by way of limitation, the invention is directed to a Connection Fault Management (CFM) maintenance point and method for providing Data Driven Connection Fault Management (DDCFM) in CFM maintenance points in a communication network.

Data Dependent and Data Driven Connection Fault Management (DDCFM) is described in the IEEE 802.1Qaw/D0.2 document, "Draft Standard for Local and Metropolitan Area Networks—Virtual Bridged Local Area Networks—Amendment 10: Data Driven and Data Dependent Connectivity Fault Management," April 2007. DDCFM provides operators with capabilities for detecting and isolating data-dependent and data-driven faults in Virtual Bridged Local Networks. DDCFM is an extension of Connection Fault Management (CFM). As with CFM, DDCFM can be used in networks operated by multiple independent organizations, each with restricted management access to the equipment of other organizations.

There are two broad types of faults in Bridged Networks that affect only frames or sequence of frames carrying certain data, addresses, or combinations of them. Simple data-dependent faults are those that result in the repetitive loss of each of frames carrying particular data, independent of any other frames. Data-dependent faults are usually the result of simple misconfiguration or of a failure to appreciate the consequences of a configuration option (for example, installing protocol specific filters). Data-driven faults are more complex and arise when the presence (or absence) of some data frames causes or contributes to the loss of other frames. While the services supported by bridged networks are notionally data-independent, the use of data-driven techniques enables enhanced service delivery. Examples include (1) multicast frame filtering and consequent bandwidth saving is facilitated by IGMP snooping; (2) stateful firewalls are used to protect users connected to managed services; and (3) efficient allocation of frames to the individual links of an aggregation (802.3ad Link Aggregation) is often based on spotting conversations by looking at frame data.

The major task of detecting data-dependent and data-driven faults (DDFs) is to discover where the DDFs actually occur. Once the DDFs are isolated to a small enough network segment, such as a bridge port or a Maintenance Point (MP), the next step of detecting why or how those data patterns or sequences actually cause the fault at this location becomes much easier. The basic procedure to isolate a DDF is to divide the network into multiple segments and determine whether the suspected data frames can traverse through each segment as expected. When a network segment is identified as being responsible for the problem, the segment is further divided into smaller segments until a bridge, a port, or a CFM Maintenance Point is identified as responsible for not passing through the service instances or the suspected data frames with expected quality. The DDF may not be apparent in the absence of live traffic (that is, when test data are used). Therefore, diagnosis must be carried out while the network is actually running, and the diagnostic tools themselves must not introduce further data-dependent faults.

DDCFM is a tool enabling operators to detect, isolate, and verify data-dependent and data-driven faults. There are two types of DDF testing: Forward Path Testing (FPT) and Return Path Testing (RPT).

Figure 1:
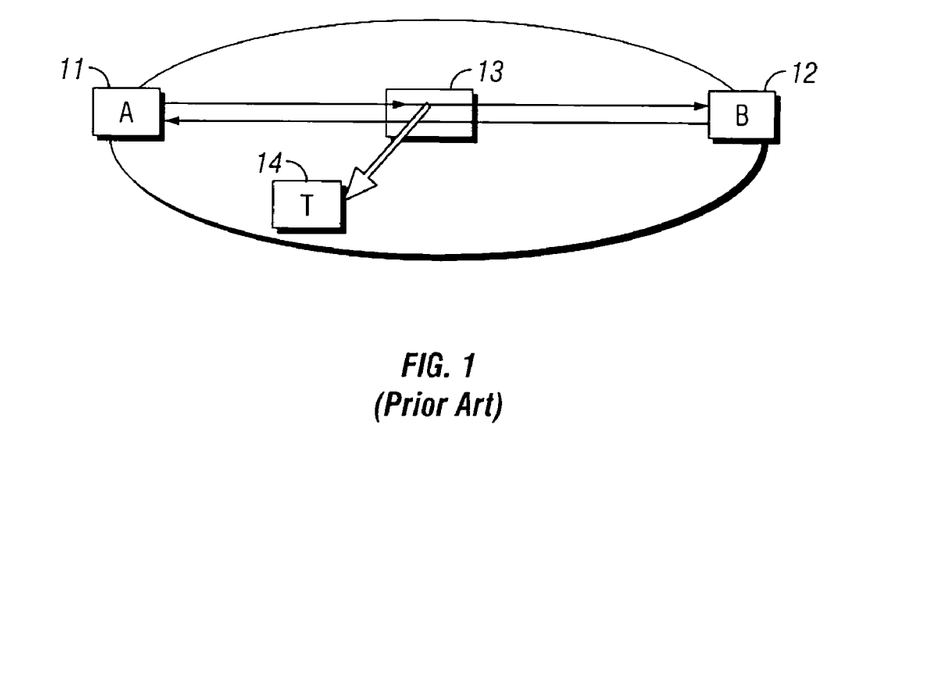
FIG. 1 (Prior Art) is a simplified block diagram of an existing mechanism for performing Forward Path Testing (FPT) for data-dependent and data-driven faults.

FIG. 1 is a simplified block diagram of an existing mechanism for performing Forward Path Testing (FPT) for data-dependent and data-driven faults. The goal of FPT is to determine whether a specified traffic flow (for example, frames associated with a service instance or selected data frames with the same Destination Address, and the like) can reach a particular location such as a bridge port or a Maintenance Point without dropping packets or developing other errors. In FIG. 1, an identified traffic flow is transmitted from a source node (A) 11 to a destination node (B) 12. FPT is achieved by reflecting (or turning around) the identified traffic flow at a reflection point 13 to a specific target location (T) 14, which could be a bridge, a test equipment, or the source node A. The reflected frames are encapsulated with a CFM header. The target location verifies the reflected data frames. There are many ways for the target location to verify the reflected data frames. For example, the target location may compare the reflected frames with the original ones to determine whether there are any errors. Alternatively, the target location may run a proxy application to simulate the handshakes as if those packets actually reach their original destinations.

Figure 2:
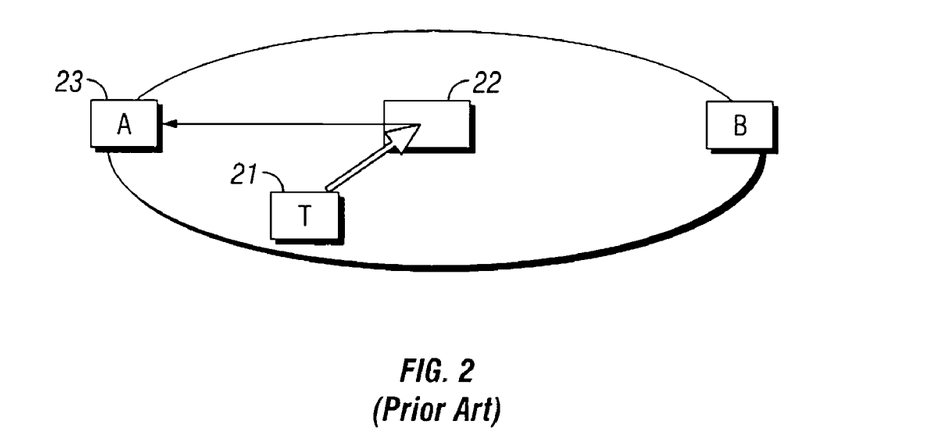
FIG. 2 (Prior Art) is a simplified block diagram of an existing mechanism for performing Return Path Testing (RPT) for data-dependent and data-driven faults.

FIG. 2 is a simplified block diagram of an existing mechanism for performing Return Path Testing (RPT) for data-dependent and data-driven faults. The goal of RPT is to determine whether a traffic flow can be sent without error from a specific point within a network to a station or stations specified by the destination address (DA) associated with the frames of the Flow-Under-Test. In FIG. 2, RPT is performed by encapsulating each frame of the Flow-Under-Test with a CFM header at an Originating station 21. The destination of the encapsulated flow is the starting point 22 of Return Path Testing. At the RPT starting point, the DDCFM encapsulated frames are decapsulated and forwarded to the station or stations specified by the DA field in the frames of the Flow-Under-Test (for example, node A 23).

Figure 3:
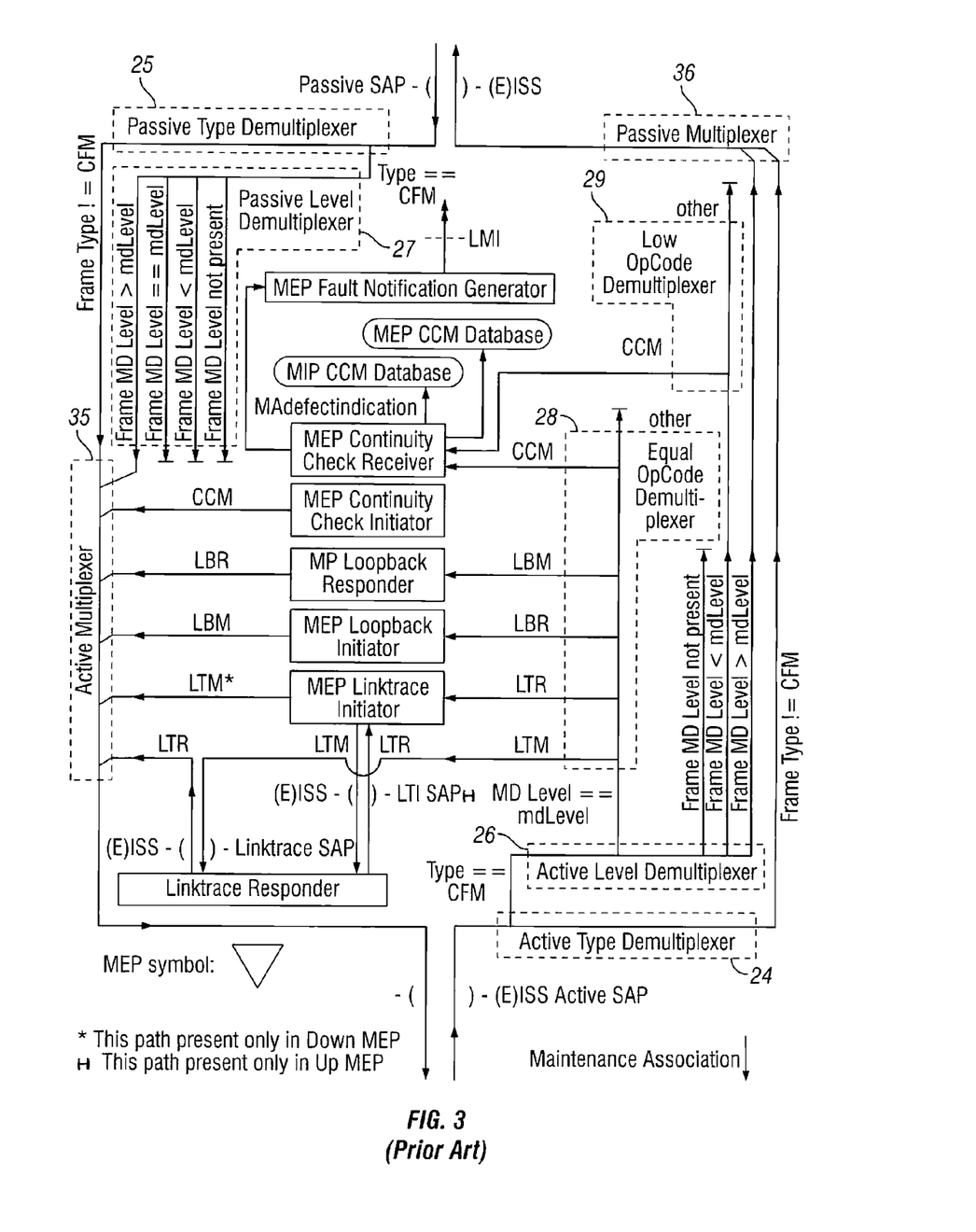
FIG. 3 (Prior Art) is a functional block diagram of an existing Maintenance association End Point (MEP)

FIG. 3 is a functional block diagram of an existing Maintenance association End Point (MEP), as illustrated and described in the IEEE 802.1ag/D8.0 document, "Draft Standard for Local and Metropolitan Area Networks—Virtual Bridged Local Area Networks—Amendment 05: Connectivity Fault Management," February 2007 (hereafter "IEEE 802.1ag/D8").

Figure 4:
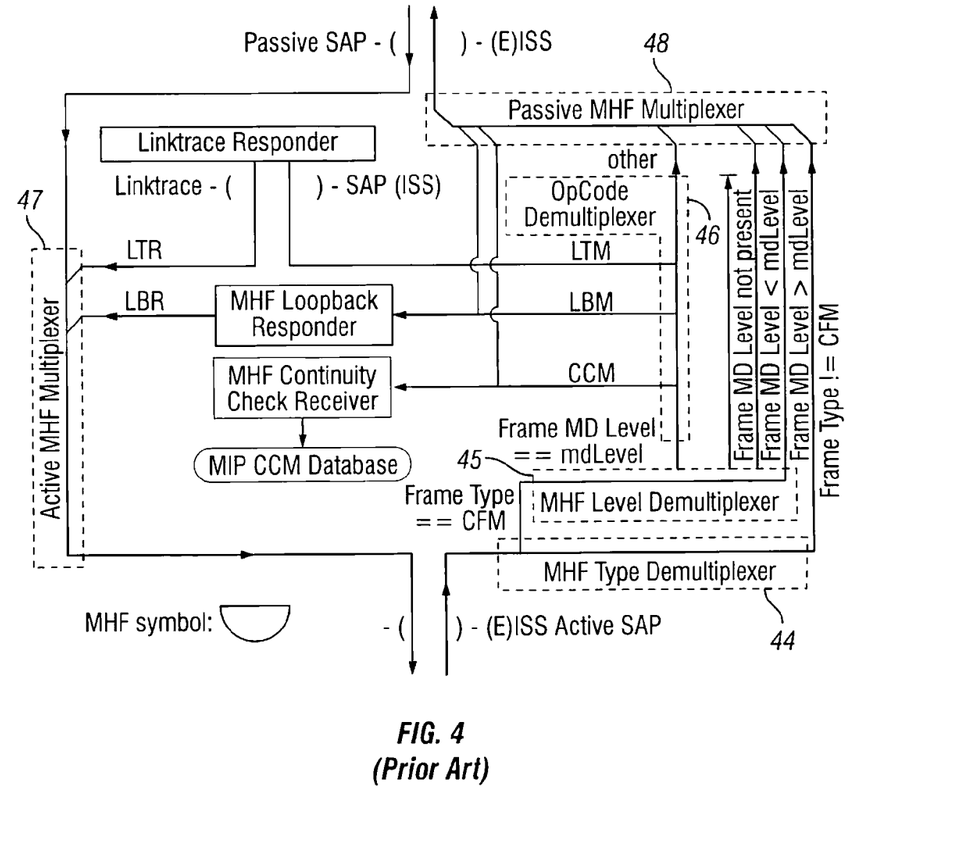
FIG. 4 (Prior Art) is a functional block diagram of an existing Maintenance domain Intermediate Point (MIP) Half Function (MHF)

FIG. 4 is a functional block diagram of an existing Maintenance domain Intermediate Point (MIP) Half Function, as also illustrated and described in IEEE 802.1ag/D8.0.

SUMMARY

The existing solution fails to provide a consistent way of implementing DDCFM in Maintenance Points as defined in IEEE802.1ag/D8.0. In particular, the existing solution does not make efficient use of the functionality of current MPs, and fails to provide functions that could be utilized to effectively identify the egress ports on DDCFM or DDCFM-related frames through a bridge. The present invention provides efficient DDCFM operation in a way that does not interrupt normal CFM operation.

In one embodiment, the present invention is directed to a CFM maintenance point, which provides DDCFM in a communication network. A Reflection Responder, an RFM Receiver, and a Decapsulator Responder are implemented in the maintenance point. The Reflection Responder selects frames to be reflected, mirrors the selected frames if a Continuation option is set, and encapsulates the selected frames with Return Frame Message (RFM) OpCode. The RFM Receiver sends received RFM frames to an analyzer if addressed to the maintenance point and otherwise to a passive multiplexer. The Decapsulator Responder decapsulates Send Frame Message (SFM) frames and sends decapsulated frames toward the destination specified in each frame.

In another embodiment, the present invention is directed to a Reflection Responder in a CFM maintenance point in a communication network. The Reflection Responder includes means for receiving data frames of frame type CFM; means for selecting data frames to be reflected; means for mirroring to a passive multiplexer entity in the CFM maintenance point, the selected frames to be continued, if a continuation option is set; means for encapsulating the selected frames with RFM OpCode; and means for selectively forwarding the RFM frames either to an active multiplexer entity in the CFM maintenance point or to both the active multiplexer entity and the passive multiplexer entity in the CFM maintenance point depending on a type of responder target address in the received frames.

In another embodiment, the present invention is directed to an RFM Receiver in a CFM maintenance point in a communication network. The RFM receiver includes means for receiving data frames of frame type RFM; means for determining whether the destination address of each received RFM frame matches a MAC address of the CFM maintenance point; means for forwarding to an analyzer, each frame having a destination address that matches the MAC address of the CFM maintenance point; and means for forwarding to the passive multiplexer entity, each frame having a destination address that does not match the MAC address of the CFM maintenance point.

In another embodiment, the present invention is directed to a Decapsulator Responder in a CFM maintenance point in a communication network. The Decapsulator Responder includes means for receiving data frames of frame type SFM; means for determining whether the destination address of each received SFM frame matches a MAC address of the CFM maintenance point; means for discarding the SFM frames having a destination address that does not match the MAC address of the CFM maintenance point; means for decapsulating the SFM frames having a destination address that matches the MAC address of the CFM maintenance point; and means for sending the decapsulated frames to an SFM responder entity.

In another embodiment, the present invention is directed to a method in a Reflection Responder in a CFM maintenance point for providing DDCFM in a communication network. The method includes the steps of: receiving data frames of frame type CFM; filtering the received data frames to select frames to be reflected; mirroring to a passive multiplexer entity in the CFM maintenance point, the selected frames to be continued, if a continuation option is set; encapsulating the selected frames with RFM OpCode; and selectively forwarding the RFM frames either to an active multiplexer entity in the CFM maintenance point or to both the active multiplexer entity and the passive multiplexer entity in the CFM maintenance point depending on a type of responder target address in the received frames.

In another embodiment, the present invention is directed to a method in a Decapsulator Responder in a CFM maintenance point for providing DDCFM in a communication network. The method includes the steps of: receiving data frames of frame type SFM; determining whether the destination address of each received SFM frame matches a MAC address of the CFM maintenance point; discarding the SFM frames having a destination address that does not match the MAC address of the CFM maintenance point; decapsulating the SFM frames having a destination address that matches the MAC address of the CFM maintenance point; and sending the decapsulated frames to an SFM responder entity.

BRIEF DESCRIPTION OF THE DRAWINGS

In the following, the essential features of the invention will be described in detail by showing preferred embodiments, with reference to the attached figures in which.

DETAILED DESCRIPTION

The present invention includes several Data Driven Connectivity Fault Management (DDCFM) functional elements, which provide efficient Data Dependent and DDCFM operation in a way that does not interrupt normal CFM operation. In an exemplary embodiment, the invention includes a Reflection Responder 30, an MP Return Frame Message (RFM) Receiver 40, and an MP Decapsulator Responder 50 implemented in the component structure of Maintenance Points (MPs) in the network. An MP may be either a Maintenance association End Point (MEP) or a Maintenance domain Intermediate Point (MIP) Half Function (MHF), as shown in FIGS. 3 and 4, respectively.

DDCFM provides capabilities for analyzing data dependent faults in a network. Thus, in order to conduct a DDCFM test, various points in a network are involved: (1) a point for initiating test traffic, (2) a point for targeting the test traffic in order to go though the same conditions as the original monitored traffic, and (3) a point where the test traffic is forwarded for performing the final analysis. In various scenarios, the points may coincide in pairs of nodes in the network, but in general the test points are implemented at different points in the network.

Two tests are described in DDCFM. One test requires RFM PDUs while the other test requires SFM PDUs. In order to conduct each of these tests, various points in the network need to be involved, and specific protocol entities need to be implemented on these points in order to provide the functionality required. The Reflection Responder 30 provides the functionality of creating RFM frames based on predefined criteria while the RFM Receiver 40 provides the functionality of capturing these RFM frames. By necessity, the Reflection Responder and the RFM Receiver are implemented for a specific test at different points in the network. The same holds true for the SFM Originator (not described) and the Decapsulator Responder 50 for the SFM frames.

The disclosure herein describes how to implement DDCFM entities in MPs (MEPs or MHFs) by reusing the existing internal functions of the MPs. This enables MPs that have already been implemented in the network to be used for DDCFM tests as originators, points of processing, or final analyzers. For an individual DDCFM test, the DDCFM entities are implemented in different MPs. A single MP may contain more than one DDCFM entity, however, enabling the MP to perform different roles for different DDCFM tests.

The description herein also specifies the DDCFM entities and protocol fields that may be used to identify the appropriate egress ports on a Bridge that implements DDCFM. In one embodiment of the present invention, the Reflection Responder, the MP Decapsulator Responder, and the MP RFM Receiver are activated by operator command and their operation is timer limited.

The Reflection Responder 30, the MP RFM Receiver 40, and the MP Decapsulator Responder 50 function as originating and terminating points for the two types of Protocol Data Units (PDUs) in DDCFM, namely Return Frame Messages (RFMs) and Send Frame Messages (SFMs). The Reflection Responder 30 identifies data that match certain filters, encapsulates the data in RFM PDUs, and sends the RFM PDUs to the MP RFM Receiver 40. The MP RFM Receiver receives the RFM PDUs and analyzes the results. An SFM Originator (not shown) sends specifically constructed data-encapsulating SFM frames to the MP Decapsulator Responder 50, where the SFM frames are received and decapsulated.

There is no direct connection between the Reflection Responder 30 and the MP RFM Receiver 40, or between the SFM Originator and the MP Decapsulator Responder 50. Instead, the RFMs and SFMs are sent on connectivity paths monitored by the Maintenance Associations (MAs) associated with the MPs of the MP RFM Receiver and the MP Decapsulator Responder, respectively. Within each MP, these DDCFM entities do not interact with functional entities that have an internal state (depicted with solid-line boxes in FIGS. 3 and 4), but they utilize the functions provided by the entities depicted with dashed-line boxes. It should also be noted that the operations of the MP RFM Receiver and the SFM Originator are considered to be outside the scope of the 802.1Qaw project (DDCFM).

When introducing new functionality on CFM, it is desirable not to stop the operation of the OAM tools associated with a specific Maintenance Association. Introducing for example a MEP-like point in the middle of a service can stop the operation of Continuity Check Messaging (CCM). The Reflection Responder 30, the MP Decapsulator Responder 50, the MP RFM Receiver 40, and the SFM Originator are CFM entities that are associated with a specific maintenance domain, enabling access only to the administrators of this domain. They can be placed at any point in the network that is bounded by any Domain Service Access Point (DoSAP) of their corresponding maintenance domains. Their relationship to MPs is guided by the MP component entities from which they obtain and send information. Thus, the Reflection Responder 30 does not require any of the MP's sub-functions as shown in FIGS. 3 and 4, and accordingly it can be defined as an independent CFM shim. The Reflection Responder can be placed at any Bridge Port bounded by the DoSAP of the Reflection Responder's associated maintenance domain. It does not even require the EISS multiplex entity. The same holds true for the SFM Originator. Note that both of these entities transmit CFM frames that are associated with a specific MA, but the creation of these DDCFM entities themselves is not associated with an MA. In practice, this means that one Reflection Responder or SFM Originator can send RFMs or SFMs (respectively), which are associated with different MAs.

The MP RFM Receiver 40 and MP Decapsulator Responder 50, on the other hand, have a number of common sub-entities with which they interface in the MPs. On top of their unique (MP) RFM Receiver and (MP) Decapsulator Responder state machines, they require a Type Demultiplexer (a function that is already provided by the Active and Passive Type Demultiplexers 24 and 25 in a MEP, or the MHF Type Demultiplexer 44 in an MHF), a Level Demultiplexer (a function that is already provided by the Active and Passive Level Demultiplexers 26 and 27 in a MEP, or the MHF Level Demultiplexer 45 in an MHF), an Opcode Demultiplexer (a function that is already provided by the Equal and Low Opcode Demultiplexers 28 and 29 in a MEP, or the Opcode Demultiplexer 46 in an MHF), and an Active and a Passive Multiplexer (functions that are already provided by the Active and Passive Multiplexers 35 and 36 in a MEP, or the Active MHF and Passive MHF Multiplexers 47 and 48 in an MHF).

In addition if the service is VLAN based, the MP RFM Receiver 40 and MP Decapsulator Responder 50 also interface with the EISS multiplex entity (not shown) as described in Section 6.15 of IEEE Std. 802.1ag-2007. By reusing the functionalities of these MP component entities, the implementation of the MP RFM Receiver and MP Decapsulator Responder is simplified when they are implemented in an MP because they only have to provide the additional functions of the MP RFM Receiver or MP Decapsulator Responder entities. Implementing these DDCFM entities on non-MPs would require implementing all the previously mentioned MP sub-entities in addition to the MP RFM Receiver and the MP Decapsulator Responder.

Figure 5:
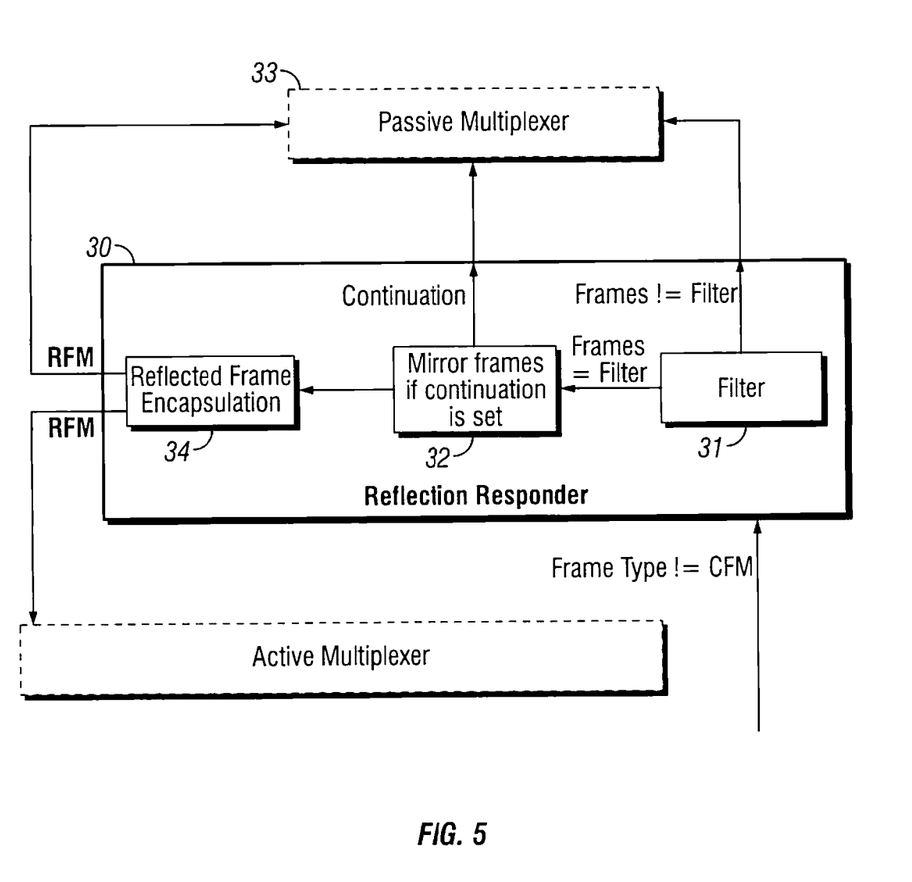
FIG. 5 is a simplified functional block diagram of a Reflection Responder in an exemplary embodiment of the present invention.
Figure 6:
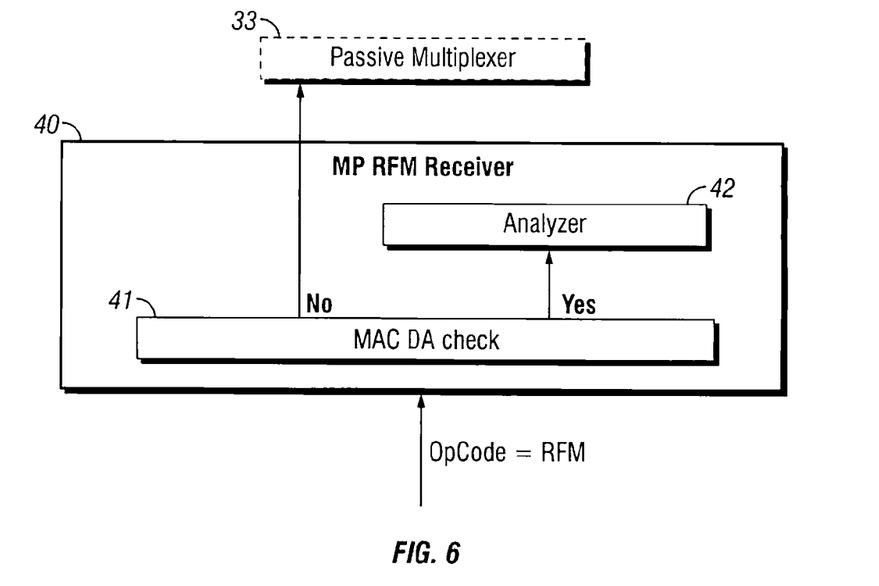
FIG. 6 is a simplified functional block diagram of am MP Return Frame Message (RFM) Receiver in an exemplary embodiment of the present invention.
Figure 7:
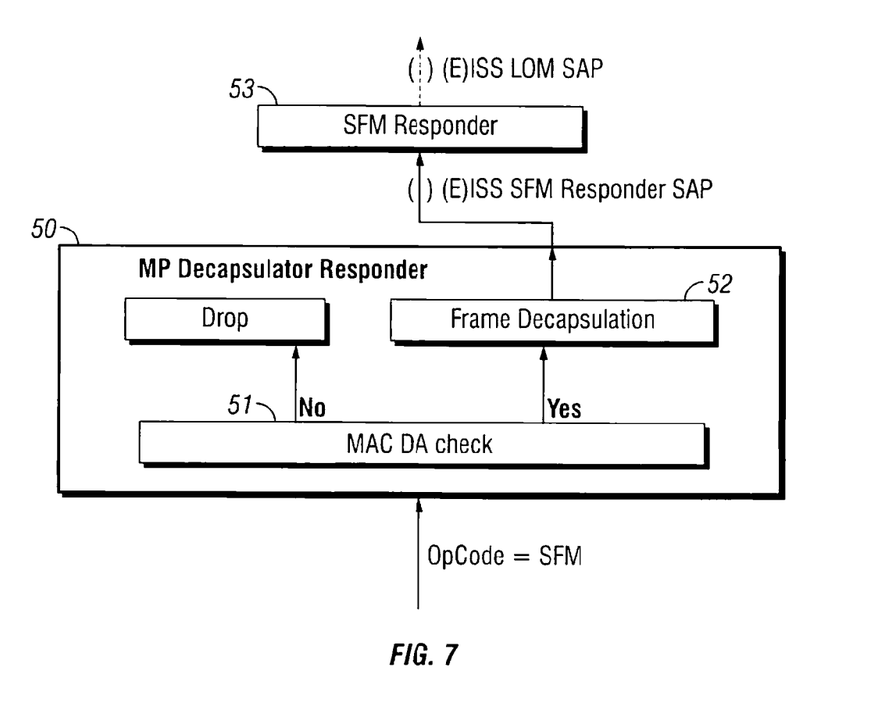
FIG. 7 is a simplified functional block diagram of an MP Decapsulator Responder in an exemplary embodiment of the present invention.

In FIGS. 5-7, the incoming Opcode arrows originate from the Equal OpCode Demultiplexer 28 in the case of a MEP (FIG. 3) or the Opcode Demultiplexer 46 in the case of a MIP (FIG. 4). The dotted line boxes labeled "Active Multiplexer" and "Passive Multiplexer" also refer to the Active and Passive Multiplexers 35 and 36 in FIG. 3 and the Active and Passive MHF Multiplexers 47 and 48 in FIG. 4.

FIG. 5 is a simplified functional block diagram of a Reflection Responder 30 in an exemplary embodiment of the present invention. The Reflection Responder is a Maintenance Point component for selecting frames to be reflected, for mirroring the selected frames to be continued if a Continuation option is set, and for encapsulating the selected frames with RFM OpCode. Implementation of the Reflection Responder on an MP guarantees both DDCFM and CFM operation, something that would require special management care if Reflection Responder were to be implemented on any other point in the network.

In one embodiment of the present invention, in a Maintenance Point that supports DDCFM, the MEP Equal OpCode Demultiplexer (FIG. 3, item 28) and the MHF OpCode Demultiplexer (FIG. 4, item 46) are modified as follows:

(a) Upon receiving a CFM frame with OpCode=SFM, duplicate and provide one copy to the MP Decapsulator Responder 50 and one to the Passive Multiplexer 36 (FIG. 3) in the case of a MEP or to the Passive MHF Multiplexer 48 (FIG. 4) in the case of a MIP; and (b) Upon receiving a CFM frame with OpCode=RFM, forward the frame to the MP RFM Receiver 40.

A Reflection Filter 31 within the Reflection Responder 30 filters frames that match a Reflection Filtering definition. A Mirror unit 32 branches the frames to two flows, a first flow towards a Relay Entity (through passive multiplexer 36 or 48) and a second flow towards a Reflected Frame Encapsulation unit 34. The Reflected Frame Encapsulation unit encapsulates the filtered frames with RFM OpCode.

The Reflection Responder 30 requires configuration with the following information:

(a) A reference to the MP on which the Reflection Responder is implemented.

(b) Reflection Filter Definition, which specifies which data frames are to be selected for reflection. For example, a destination address or source address in the frames indicating a particular VLAN ID may be used as filter criteria.

(c) The Reflection Target Address, which is a MAC address to which the reflected frames are targeted.

(d) Continuation option, which indicates whether or not the reflected frames are also to be continued towards the destination address specified in the frame header.

(e) Timer for Forward Path Testing (reflection action) to stay active after being activated.

(f) The priority and crop_eligible parameters to be used in the transmitted encapsulated frames (default is CCM priority 802.1ag 12.14.7.1.3).

The Forward Path Testing Reflection Point (not shown) is an MP within a maintenance association. CFM PDUs include a field known as the MD Level, which along with the VLAN ID (VID) of the VLAN tag, indicates to which maintenance association the PDU belongs. The MD Level determines which MPs are interested in the content of a CFM PDU, and the MPs through which the frame carrying the CFM PDU is allowed to pass. Incoming un-encapsulated data frames do not carry any MD Level information; therefore they will always be processed by the lowest level Reflection Responder. This, in effect, means that only one Reflection Point can be configured on a port.

The Reflection Filter 31 selects data frames to be reflected. The following selection algorithms may be supported by all Bridges for the Reflection Filter:

(a) Reflect All: all frames within the associated MA level are selected for reflection.

(b) Service Instance-Based Selection: all data frames belonging to the specified service instances are selected for reflection.

(c) Destination Address-Based Selection: all data frames with the specified Destination Address are selected for reflection.

(d) Source Address-Based Selection: all data frames with the specified Source Address are selected.

Additional reflection selection algorithms may also be defined.

The Reflection Target is an address to which the DDCFM encapsulated reflected frames are forwarded. The Reflection Target may be a Maintenance association End Point (MEP), a Maintenance association Intermediate Point (MIP), a bridge, or a test equipment which does not participate in CFM protocols. The Target must be within the same Maintenance Domain as the Reflection Point in order to receive the CFM encapsulated reflected data frames.

If the Target is an MP, it must have the same Maintenance Domain level as the Reflection Point. If the Target is not a MP, it must be capable of terminating the DDCFM encapsulated frames, even though it does not have to terminate other CFM messages defined in Section 18 of IEEE 802.1ag/D8.

FIG. 6 is a simplified functional block diagram of an MP RFM Receiver 40 in an exemplary embodiment of the present invention. If DDCFM is supported, FIG. 6 should be added to the component entities of an MP as depicted in FIGS. 3 and 4, attaching it to the appropriate depicted sub entities. The RFM Receiver is associated with the target point of RFMs. Its implementation is highly simplified if it is done on an MP (MEP or MHF). Implementation on any other point in the network is much more difficult on a device basis while also requiring administrative domain-wide management (i.e., knowledge of other Maintenance Domains in the region).

Within the MP RFM Receiver 40, a MAC DA Check Unit 41 checks the Destination Address of the received frame (OpCode=RFM) received from the Equal OpCode Demultiplexer 28 (MEP) or the Opcode Demultiplexer 46 (MIP) of the MP. If the Destination Address matches the MAC address of the receiving MP, the frame is forwarded to an Analyzer 42. Otherwise, the frame is forwarded to the Passive Multiplexer 36 (MEP) or the Passive MHF Multiplexer 48 (MIP) of the MP.

The "Continuation" option allows the selected data frames to be continued to their original destinations as well as reflected by making a copy of the selected frames to be reflected. The Continuation option can be set to be either "Yes" or "No". When "Yes" is chosen for the Continuation option, the selected data frames are branched to two directions: one direction to the Reflection Responder 30 and another direction to the MAC Relay Entity (through the passive multiplexer 33). When "No" is chosen for the Continuation option, the selected frames are only forwarded to the Reflection Responder 30.

Reflecting data frames back into the network can create extra traffic in the network. To prevent this action from running forever, a timer is used to limit the reflection action to a fixed period of time.

FIG. 7 is a simplified functional block diagram of an MP Decapsulator Responder 50 in an exemplary embodiment of the present invention. If DDCFM is supported, FIG. 7 should be added to the component entities of an MP as depicted in FIGS. 3 and 4, attaching it to the appropriate depicted sub entities. Implementation of the Decapsulator Responder is highly simplified if it is done on an MP (MEP or MHF). Implementation on any other point in the network is much more difficult on a device basis while also requiring administrative domain-wide management (i.e., knowledge of other Maintenance Domains in the region).

The MP Decapsulator Responder 50 decapsulates Send Frame Messages (SFMs) received from the Equal OpCode Demultiplexer 28 (MEP) or the Opcode Demultiplexer 46 (MIP) of the MP, and sends decapsulated frames towards their destinations specified by the decapsulated data frames.

When an SFM is received by a port which has the MP Decapsulator Responder 50 activated, the SFM may be examined for validity and discarded if invalid. A MAC DA Check Unit 51 checks the Destination Address of the received SFM. If the Destination Address does not match the MAC address of the receiving MP, the frame is discarded. If the Destination Address matches, the frame is forwarded to a Frame Decapsulation Unit 52. The decapsulated frame is then passed to an SFM Responder Entity 53 as an (Enhanced) Internal Sublayer Service ((E)ISS) SFM Responder Service Access Point (SAP) message. The SFM Responder Entity identifies an egress port by querying a Filtering Database (FDB). The query may use the target address of the decapsulated data frame. A bit in the Flags field of tie SFM message indicates if the frame is to be flooded or discarded if no FDB entry exists. The frame is then sent to the identified egress port as an (E)ISS Linktrace Output Multiplexer (LOM) SAP message using the same path as the Linktrace Messages (LTMs) as described in section 19.5 of IEEE Std 802.1ag.

For an MP that supports DDCFM, the MEP Equal OpCode Demultiplexer and the MHF OpCode Demultiplexer should be updated as follows:

(a) Upon receiving a CFM frame with OpCode=SFM, duplicate and provide one copy to the MP Decapsulator Responder and one copy to the Passive Multiplexer 36 (MEP) or to the Passive MHF Multiplexer 48 (MIP).

(b) Upon receiving a CFM frame with OpCode=RFM, forward the frame to the MP RFM Receiver 40.

The originator for the SFM frames does not have to be an MP. However, the originator must be configured with the same Maintenance Domain level as the Return Path Testing Reflection Point, so that the SFM can have the proper Maintenance Domain level for the messages to be forwarded as needed.

DDCFM protocols may be specified in terms of a number of state machines, with a number of variables and procedures associated with each machine. A Reflection Responder timer variable, FPTwhile, is defined as a timer variable used by the RR state machine to de-activate the Reflector after a predefined time period. The Reflection Responder variable, FPTtime, is a variable specifying the time that the Reflection Responder can stay active after its activation. The Reflection Responder variable, ReflectionActive, essentially turns the Reflection Responder on and off. When set to "TRUE", the Reflection Responder actively selects frames defined by the filter to be reflected. When set to "FALSE", the Reflection Responder transparently passes all frames to the Passive multiplexer.

Figure 8:
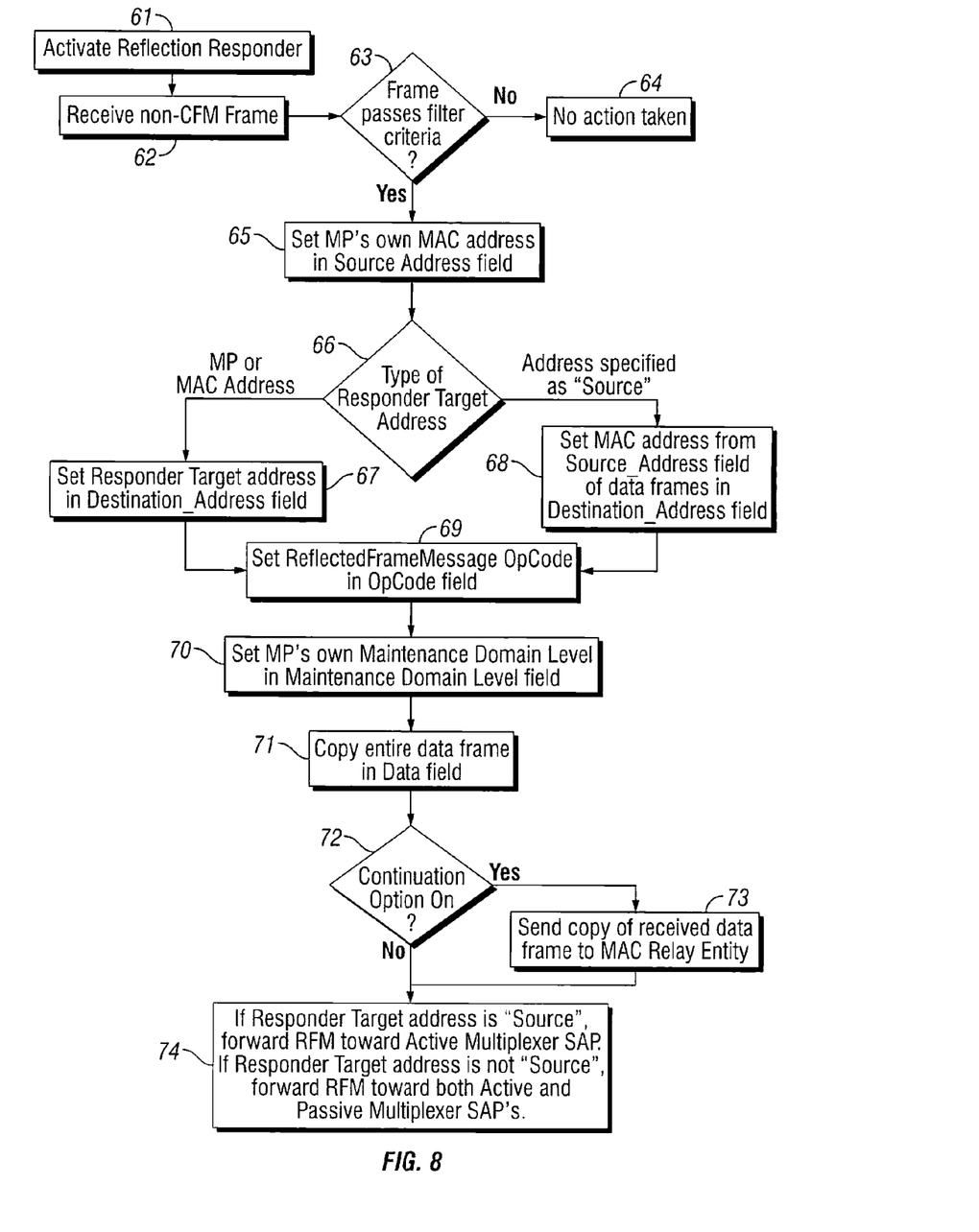
FIG. 8 is a flow chart of a Reflector Responder Procedure in an exemplary embodiment of the method of the present invention.

FIG. 8 is a flow chart of a Reflection Responder Procedure, ProcessFPT( ), in an exemplary embodiment of the method of the present invention. At step 61, the Reflection Responder is activated and the Reflection Responder State Machine calls the ProcessFPT( ) process. At step 62, the Reflection Responder receives a non-CFM frame. At step 63, it is determined whether the received frame passes the filter criteria for the Responder. If not, the method moves to step 64 where the ProcessFPT( ) takes no action. If the received frame passes the filter criteria, the method moves to step 65 where the ProcessFPT( ) sets the MP's own MAC address in the Source Address field. At step 66, the type of Responder Target Address is determined. If the Responder Target Address is an MP or a MAC address, the method moves to step 67 where the Responder Target Address is set in the Destination_Address field. If the Responder Target Address is specified as "Source", the method moves to step 68 where the MAC address from the Source_Address field of the received frame is set in the Destination_Address field.

From step 67 or 68, the method moves to step 69 where the ProcessFPT( ) sets the ReflectedFrameMessage Opcode in the OpCode field. At step 70, the ProcessFPT( ) sets the MP's own Maintenance Domain Level in the Maintenance Domain Level field. At step 71, the ProcessFPT( ) copies the entire received frame in the Data field. At step 72, it is determined whether the "Continuation" option is ON. If so, the method moves to step 73 where a copy of the received frame is sent to the MAC Relay Entity. At step 74, if the Responder Target Address is specified as "Source", the RFM is forwarded toward the Active Multiplexer SAP. If the Responder Target Address is not specified as "Source", the RFM is forwarded toward both the Active and the Passive Multiplexer SAPs.

Figure 9:
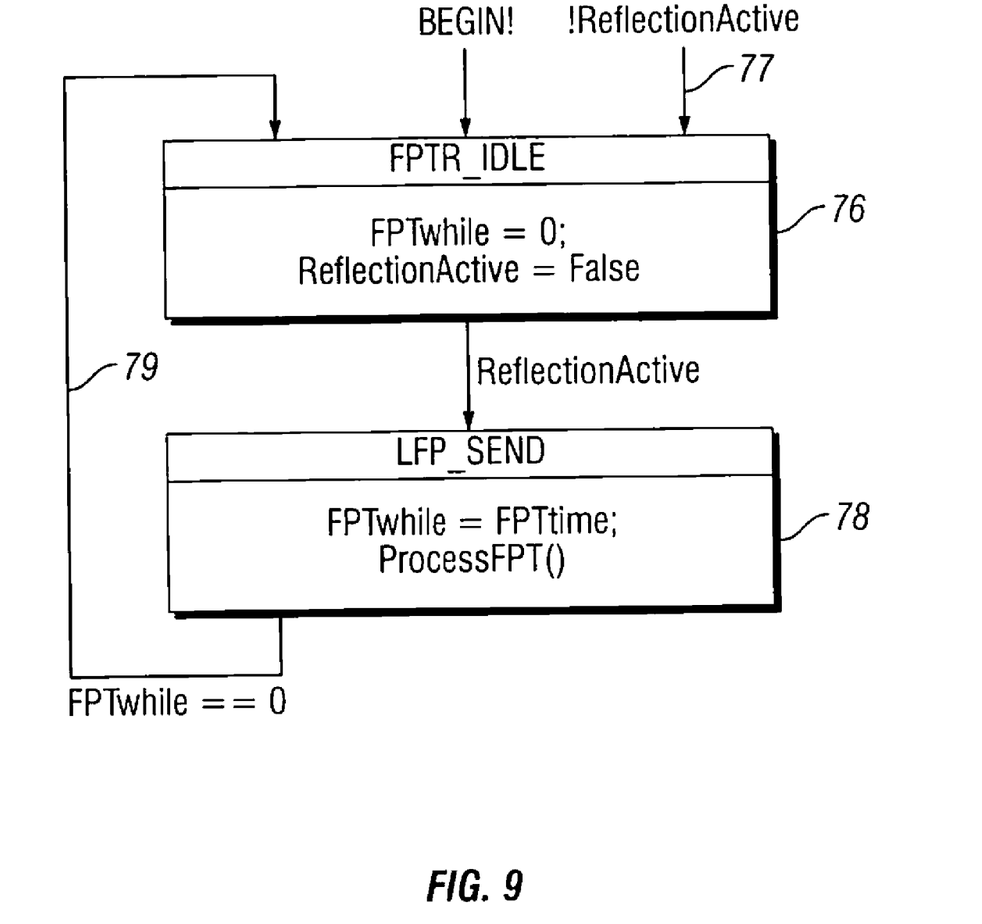
FIG. 9 is an illustration of a Reflection Responder State Machine in an exemplary embodiment of the present invention.

FIG. 9 is an illustration of a Reflection Responder State Machine in an exemplary embodiment of the present invention. Once the Reflection Responder is configured and activated by a network administrator, it stays active until the configured timer expires or there is an action to stop the testing. Thus, when the Reflection Responder is deactivated, the state machine is in state FPTR_IDLE 76. When a ReflectionActive instruction 77 is received from the network administrator, the state machine transitions to the LFP_SEND state 78 and remains in that state until the configured timer expires or an instruction to stop the testing is received. Upon one of those events, the state machine transitions at 79 back to the FPTR_IDLE state and the Reflection Responder is deactivated.

The MP Decapsulator Reflector state machine may utilize the timer variable "RPTwhile" to de-activate the Decapsulator.

The time that the Decapsulator Responder can stay active after its activation may be represented by the Decapsulator Responder variable "RPTtime".

When the Decapsulator Responder variable "ReflectionActive" is set to "FALSE", the Decapsulator Responder discards all frames received.

Figure 10:
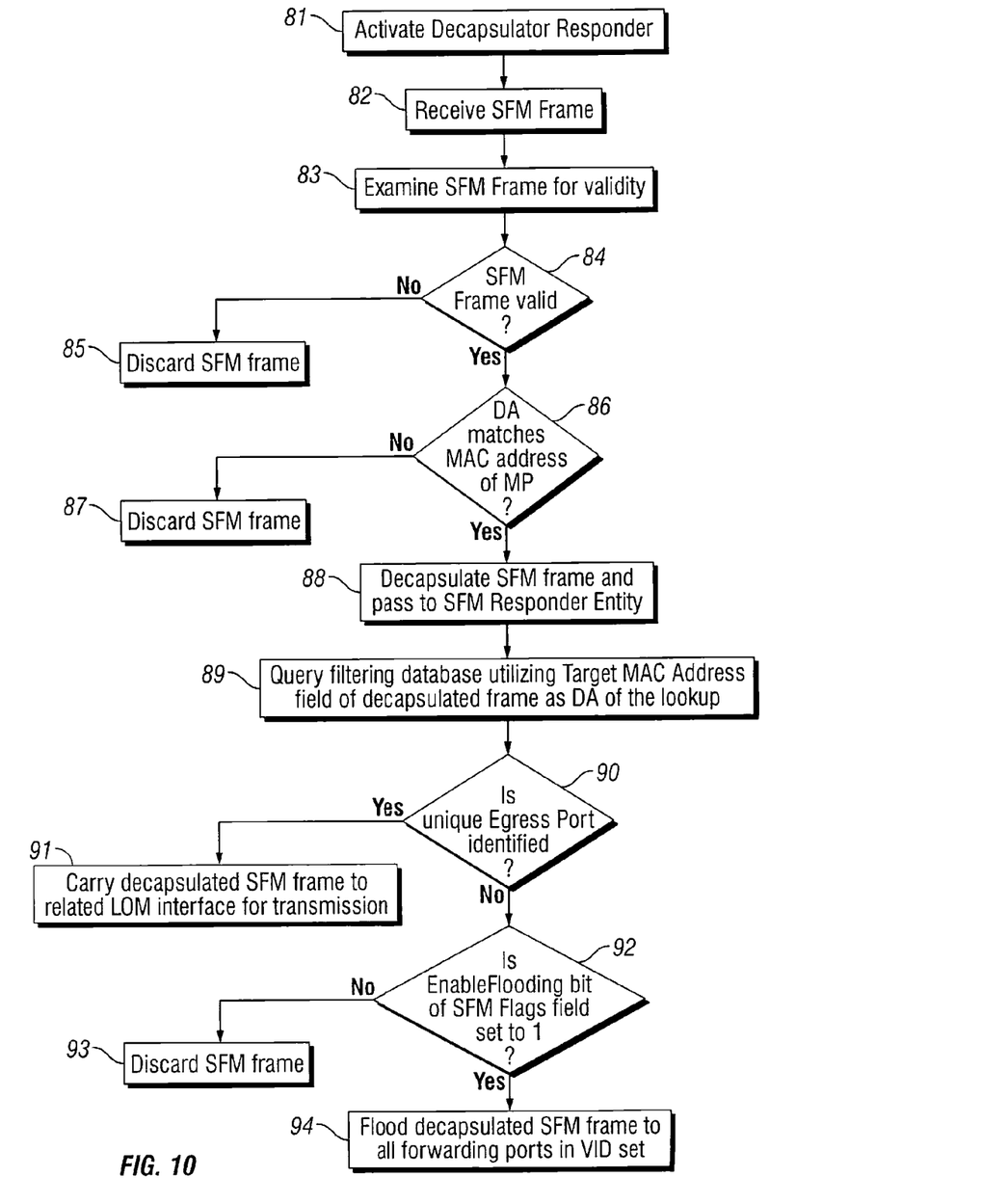
FIG. 10 is a flow chart of a Decapsulator Responder Procedure, ProcessSFM( ), in an exemplary embodiment of the method of the present invention.

FIG. 10 is a flow chart of a Decapsulator Responder Procedure, ProcessSFM( ), in an exemplary embodiment of the method of the present invention. At step 81, the Decapsulator Responder is activated and the MP Decapsulator State Machine calls the ProcessSFM( ) process. At step 82, the Decapsulator Responder receives an SFM frame. At step 83, the received SFM frame is examined for validity using the methods used for CFM messages as described in (20.46) of IEEE802.1ag/D8.0. At step 84, it is determined whether the SFM frame is valid. If not, the method moves to step 85 where the SFM frame is discarded. If the SFM frame is valid, it is then determined at step 86 whether the destination_address matches the MAC address of the receiving MP. If not, the method moves to step 87 where the SFM frame is discarded. However, if the destination_address matches the MAC address of the receiving MP, the process moves to step 88 where the SFM frame is decaspulated and passed to the SFM Responder Entity.

At step 89, the ProcessSFM( ) queries the Filtering Database utilizing the Target MAC Address field of the decapsulated frame as the destination_address of the lookup. The set of potential transmission ports, normally created by the Active topology enforcement (as described in (8.6.1) of IEEE P802.1Q—2006/D0.1 document, "Draft Standard for Local and Metropolitan Area Networks—Virtual Bridged Local Area Networks") is the set of all Bridge Ports that are both in the active set of the vlan_identifier of the SFM, and that are in the Forwarding state for that vlan_identifier, except that the Ingress Port is excluded from the set. At step 90, it is determined whether a unique Egress Port is identified. If so, the method moves to step 91 where the decaspulated frame is carried to the related LOM interface for transmission. If the Filtering Database could not produce a unique Egress Port, the method moves to step 92 where it is determined whether the EnableFlooding bit of the Flags field of the SFM frame is set to "1". If not, the method moves to step 93 where the SFM frame is discarded. If the EnableFlooding bit of the Flags field of the SFM frame is set to "1", the method moves to step 94 where the decaspulated frame is flooded to all forwarding ports in the VID set.

Whenever the Decapsulator Responder is de-activated, the MP Decapsulator Reflector Machine calls the DropSFM( ) procedure in order to drop received frames.

Figure 11:
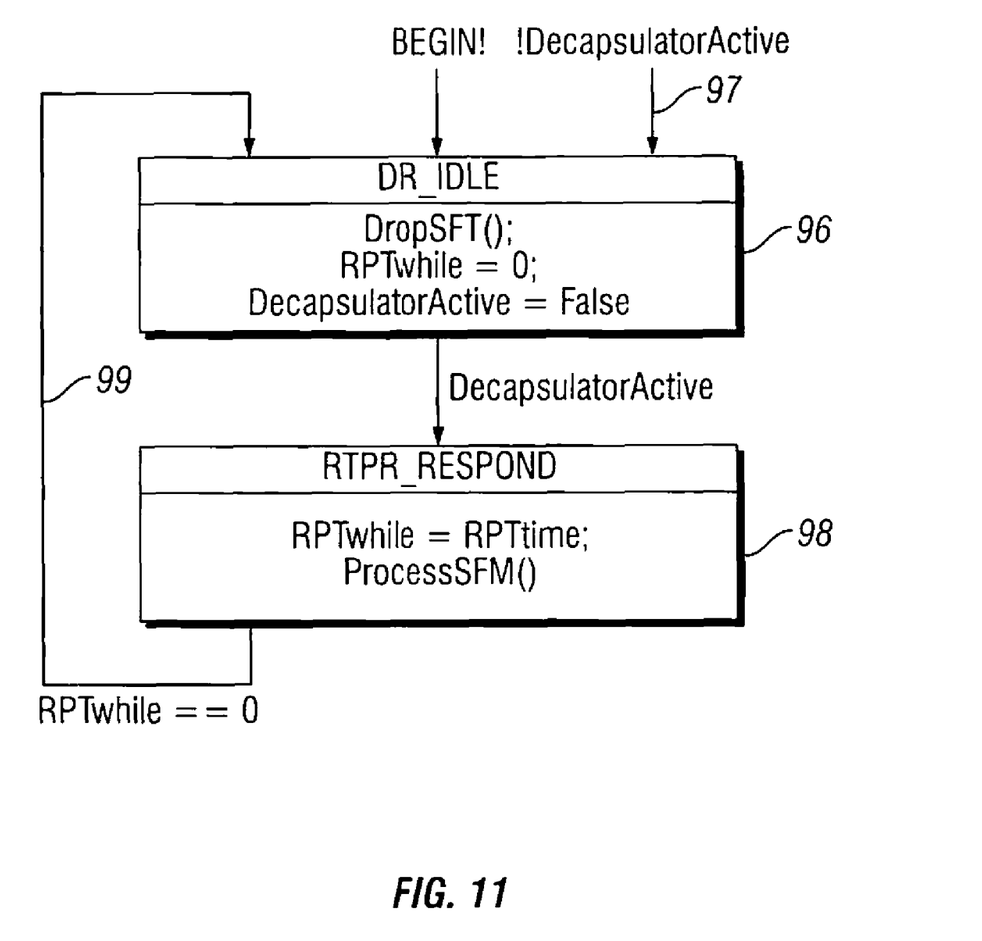
FIG. 11 is an illustration of a Decapsulator Responder State Machine in an exemplary embodiment of the present invention.

FIG. 11 is an illustration of a Decapsulator Responder State Machine in an exemplary embodiment of the present invention. Once the Decapsulator Responder is configured and activated by a network administrator, it stays active until the configured timer expires or there is an action to stop the testing. Thus, when the Decapsulator Responder is deactivated, the state machine is in state DR_IDLE 96. When a DecapsulatorActive instruction 97 is received from the network administrator, the state machine transitions to the RTPR_RESPOND state 98 and remains in that state until the configured timer expires or an instruction to stop the testing is received. Upon one of those events, the state machine transitions at 99 back to the DR_IDLE state and the Decapsulator Responder is deactivated.

In the above-described manner, the present invention makes efficient use of the functionality of current MPs, and effectively identifies the egress ports for DDCFM or DDCFM-related frames in a bridge. The present invention provides efficient DDCFM operation in a way that does not interrupt normal CFM operation.

Although preferred embodiments of the present invention have been illustrated in the accompanying drawings and described in the foregoing Detailed Description, it is understood that the invention is not limited to the embodiments disclosed therein, but is defined by the following claims.

What is claimed is:

1. A Connection Fault Management (CFM) maintenance point for providing Data Driven Connection Fault Management (DDCFM) in a communication network, the CFM maintenance point comprising CFM maintenance point multiplex and demultiplex entities enhanced with an Opcode Demultiplex entity that forwards a first copy of data frames of frame type Send Frame Message (SFM) towards Passive Multiplexers of the CFM maintenance point and a second copy of the SFM data frames towards a Decapsulator Responder, wherein the CFM maintenance point includes a processor coupled to a non-transitory memory, wherein when the processor executes computer program instructions stored on the non-transitory memory, the processor causes the Decapsulator Responder to:
receive the SFM data frames from the Opcode Demultiplexer;
determine whether the destination address of each received SFM frame matches a Media Access Control (MAC) address of the CFM maintenance point;
discard the SFM frames having a destination address that does not match the MAC address of the CFM maintenance point;
decapsulate the SFM frames having a destination address that matches the MAC address of the CFM maintenance point; and
send the decapsulated frames toward a destination specified by the decapsulated data frame, wherein a filtering database is queried to determine an egress port for the decapsulated frames;
if a unique egress port is identified, carry each decapsulated frame to a related Linktrace Output Multiplexer (LOM);
if a unique egress port is not identified:
determine whether an EnableFlooding bit of an SFM Flags field is set;
if the EnableFlooding bit is not set, discard the SFM frame; and
if the EnableFlooding bit is set, flood each decapsulated frame to all forwarding ports in an associated Virtual Local Area Network Identity (VID) set.

2. A Decapsulator Responder in a Connection Fault Management (CFM) maintenance point in a communication network, wherein the Decapsulator Responder includes a processor coupled to a non-transitory memory, and when the processor executes computer program instructions stored on the non-transitory memory, the processor causes the Decapsulator Responder to:
receive data frames of frame type Send Frame Message (SFM);
determine whether the destination address of each received SFM frame matches a Media Access Control (MAC) address of the CFM maintenance point;
discard the SFM frames having a destination address that does not match the MAC address of the CFM maintenance point;
decapsulate the SFM frames having a destination address that matches the MAC address of the CFM maintenance point; and
send the decapsulated frames toward a destination specified by the decapsulated data frame, wherein a filtering database is queried to determine an egress port for the decapsulated frames;
if a unique egress port is identified, carry each decapsulated frame to a related Linktrace Output Multiplexer (LOM);
if a unique egress port is not identified:
determine whether an EnableFlooding bit of an SFM Flags field is set;
if the EnableFlooding bit is not set, discard the SFM frame; and
if the EnableFlooding bit is set, flood each decapsulated frame to all forwarding ports in an associated Virtual Local Area Network Identity (VID) set.

3. A method in a Decapsulator Responder in a Connection Fault Management (CFM) maintenance point for providing Data Driven Connection Fault Management (DDCFM) in a communication network, said method comprising the steps of:
receiving data frames of frame type Send Frame Message (SFM);
determining whether the destination address of each received SFM frame matches a Media Access Control (MAC) address of the CFM maintenance point;
discarding the SFM frames having a destination address that does not match the MAC address of the CFM maintenance point;

decapsulating the SFM frames having a destination address that matches the MAC address of the CFM maintenance point; and sending the decapsulated frames toward a destination specified by the decapsulated data frame, wherein a filtering database is queried to determine an egress port for the decapsulated frames;

if a unique egress port is identified, carrying each decapsulated frame to a related Linktrace Output Multiplexer (LOM);

if a unique egress port is not identified:
  determining whether an EnableFlooding bit of an SFM Flags field is set;
  if the EnableFlooding bit is not set, discarding the SFM frame; and
  if the EnableFlooding bit is set, flooding each decapsulated frame to all forwarding ports in an associated Virtual Local Area Network Identity (VID) set.

* * * * *

UNITED STATES PATENT AND TRADEMARK OFFICE
CERTIFICATE OF CORRECTION

PATENT NO. : 8,310,941 B2  
APPLICATION NO. : 12/105610  
DATED : November 13, 2012  
INVENTOR(S) : Saltsidis Page 1 of 1

It is certified that error appears in the above-identified patent and that said Letters Patent is hereby corrected as shown below:

On the Title Page, in Item [56], under "OTHER PUBLICATIONS", in Column 1, Lines 1-2, delete "Netwrks-Amendment" and insert -- Networks-Amendment --, therefor.

On the Title Page, in Item [56], under "OTHER PUBLICATIONS", in Column 2, Line 1, delete "contribution." and insert -- contribution, --, therefor.

In the Specification:

In Column 4, Line 45, delete "am" and insert -- an --, therefor.

In Column 9, Line 26, delete "tie" and insert -- the --, therefor.

In Column 10, Line 66, delete "decaspulated" and insert -- decapsulated --, therefor.

In Column 11, Line 13, delete "decaspulated" and insert -- decapsulated --, therefor.

In Column 11, Line 20, delete "decaspulated" and insert -- decapsulated --, therefor.

Signed and Sealed this  
Eighteenth Day of June, 2013

Teresa Stanek Rea  
*Acting Director of the United States Patent and Trademark Office*